(12) United States Patent
SivaSiva Ganesan et al.

(10) Patent No.: US 11,470,568 B2
(45) Date of Patent: Oct. 11, 2022

(54) SYNCHRONIZING TSN MASTER CLOCKS IN WIRELESS NETWORKS

(71) Applicant: Nokia Solutions and Networks Oy, Espoo (FI)

(72) Inventors: Rakash SivaSiva Ganesan, Unterhaching (DE); Wolfgang Zirwas, Munich (DE); Berthold Panzner, Holzkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 83 days.

(21) Appl. No.: 17/259,807

(22) PCT Filed: Jul. 25, 2018

(86) PCT No.: PCT/IB2018/055565
§ 371 (c)(1),
(2) Date: Jan. 12, 2021

(87) PCT Pub. No.: WO2020/021309
PCT Pub. Date: Jan. 30, 2020

(65) Prior Publication Data
US 2021/0144666 A1    May 13, 2021

(51) Int. Cl.
*H04W 56/00* (2009.01)
*H04J 3/06* (2006.01)

(52) U.S. Cl.
CPC ....... *H04W 56/0015* (2013.01); *H04J 3/0658* (2013.01)

(58) Field of Classification Search
CPC . H04J 3/0658; H04J 3/0667; H04W 56/0015; H04W 56/00
(Continued)

(56) References Cited

U.S. PATENT DOCUMENTS

| 6,434,205 B1 | 8/2002 | Taura et al. |
| 7,590,151 B2 | 9/2009 | Middleton et al. |

(Continued)

FOREIGN PATENT DOCUMENTS

| CN | 102098155 A | 6/2011 |
| CN | 203313199 U | 11/2013 |

(Continued)

OTHER PUBLICATIONS

Office action received for corresponding Indian Patent Application No. 202147006865, dated Jan. 19, 2022, 6 pages.
(Continued)

*Primary Examiner* — Robert J Lopata
(74) *Attorney, Agent, or Firm* — Nokia Technologies Oy

(57) ABSTRACT

A synchronization signal is received at a user equipment from a base station. The user equipment synchronizes clocks between the user equipment and the base station using a combination of sample and sub-sample timing determined based at least in part on the synchronization signal. At a base station, the base station transmits toward a user equipment a synchronization signal. The base station synchronizes clocks between the base station and the user equipment using a combination of sample and sub-sample timing determined based on at least the synchronization signal. Methods, apparatus, software, and computer program products are disclosed.

17 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 9,369,269 | B2 | 6/2016 | Dionne et al. |
| 10,267,912 | B1* | 4/2019 | Birkenes .............. G10K 11/341 |
| 2008/0025417 | A1 | 1/2008 | Zhidkov et al. |
| 2011/0007717 | A1 | 1/2011 | Swarts et al. |
| 2014/0281037 | A1* | 9/2014 | Spada ................... H04J 3/0641 709/248 |
| 2016/0095075 | A1* | 3/2016 | Bin Sediq ........... H04W 56/001 370/350 |
| 2016/0170440 | A1* | 6/2016 | Aweya ....................... G06F 1/10 713/503 |
| 2016/0192303 | A1* | 6/2016 | Tender ................ H04W 56/001 370/316 |
| 2016/0381563 | A1* | 12/2016 | Khalek ................. H04W 16/14 455/454 |
| 2018/0109409 | A1* | 4/2018 | Kobayashi .......... H04L 27/2662 |
| 2018/0284149 | A1* | 10/2018 | Kommi ................... G01P 15/08 |
| 2019/0064873 | A1* | 2/2019 | Carlstedt .................... G06F 1/12 |
| 2019/0190635 | A1* | 6/2019 | Goel ...................... H04J 3/0644 |
| 2019/0191403 | A1* | 6/2019 | Goel ................... H04L 27/2656 |
| 2019/0306855 | A1* | 10/2019 | Tiirola ................. H04L 27/2607 |
| 2020/0028768 | A1* | 1/2020 | Sadiq ................... H04B 7/0617 |
| 2021/0176103 | A1* | 6/2021 | Thomas ............... H04B 1/0003 |
| 2021/0289243 | A1* | 9/2021 | Mochida .......... H04N 21/21805 |

FOREIGN PATENT DOCUMENTS

| | | |
|---|---|---|
| WO | 2012/075881 A1 | 6/2012 |
| WO | 2017/198304 A1 | 11/2017 |
| WO | 2019/166081 A1 | 9/2019 |

OTHER PUBLICATIONS

Hummen et al., "TSN—Time Sensitive Networking", White Paper, Hirschmann, 2016, pp. 1-12.

"P802.1Qcc—Stream Reservation Protocol (SRP) Enhancements and Performance Improvements", IEEE802.1, Retrieved on Jan. 11, 2021, Webpage available at: http://www.ieee802.org/1/pages/802.1cc.html.

"Welcome to the IEEE 802.1 Working Group", IEEE802.1, Retrieved on Jan. 11, 2021, Webpage available at: http://www.ieee802.org/1/.

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.

"3rd Generation Partnership Project; Technical Specification Group Services and System Aspects; Study on Communication for Automation in Vertical Domains; (Release 16)", 3GPP TR 22.804, V0.3.0, Nov. 2017, pp. 1-137.

"URLLC for Heterogeneous Industrial Networks with Time Synchronization Requirement", 3GPP TSG RAN WG1 Meeting #90, R1-1714175, Agenda : 6.1.3.3.8, SIA, Aug. 21-25, 2017, 3 pages.

"Precision Time Protocol Software Configuration Guide for IE 4000, IE 4010, and IE 5000 Switches", Cisco, Retrieved on Jan. 11, 2021, Webpage available at: https://www.cisco.com/c/en/us/td/docs/switches/lan/cisco_ie4000/software/release/15-2_4_e/b_ptp_ie4k.html.

International Search Report and Written Opinion received for corresponding Patent Cooperation Treaty Application No. PCT/IB2018/055565, dated Apr. 10, 2019, 11 pages.

\* cited by examiner

SYNCHRONIZING TSN MASTER CLOCKS IN WIRELESS NETWORKS

RELATED APPLICATION

This application claims priority to PCT Application No. PCT/IB2018/055565 filed Jul. 25, 2018 which is incorporated herein by reference in its entirety.

TECHNICAL FIELD

This invention relates generally to tactile industrial networks, also known as Industrial Internet of Things (IIoTs) or Industry 4.0 networks, and, more specifically, relates to Time Sensitive Networking (TSN) in such networks and application of wireless networks such as radio access networks (RANs) in those industrial networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Time sensitive networking (TSN) is being standardized by IEEE 802.1 to provide industrial networks with deterministic delay to handle time sensitive traffic. Currently, wired links are assumed for connecting the sensors and controllers. Moving from wired to wireless sensors and actuators provide advantages, such as mobility, scalability, low cost maintenance, and the like. To connect the wireless devices to a TSN network, wireless transmission technologies such as the ones defined in 3 GPP are necessary. While description herein centers on 3GPP networks, these networks could be generalized to any wireless communication system. Similarly, the TSN networks described herein can be generalized to networks that offer communications with specialized quality of service (QoS) such as "Deterministic and low delay". In such networks, synchronizing the clocks of the network entities is a key to achieving very low deterministic delay.

That is, a key feature necessary to achieve deterministic end-to-end (E2E) latency in a TSN network is by synchronizing all the network elements to a master clock in the system. In the conventional TSN network with wired links, this is achieved to a precision of fraction of a nanosecond. However, for wireless links, the maximum precision possible is limited to the sampling time, e.g., for 20 MHz bandwidth this corresponds to 32 nanoseconds. In order to achieve deterministic E2E latency, new mechanisms are needed that enable synchronizing to sub-sample precision.

BRIEF SUMMARY

This section is intended to include examples and is not intended to be limiting.

An exemplary embodiment is a method, comprising receiving at a user equipment a synchronization signal from a base station. The method also includes synchronizing clocks between the user equipment and the base station using a combination of sample and sub-sample timing determined based at least in part on the synchronization signal.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving at a user equipment a synchronization signal from a base station; and synchronizing clocks between the user equipment and the base station using a combination of sample and sub-sample timing determined based at least in part on the synchronization signal.

An exemplary computer program product includes a computer-readable storage medium bearing computer program code embodied therein for use with a computer. The computer program code includes: code for receiving at a user equipment a synchronization signal from a base station; and code for synchronizing clocks between the user equipment and the base station using a combination of sample and sub-sample timing determined based at least in part on the synchronization signal.

In another exemplary embodiment, an apparatus comprises: means for receiving at a user equipment a synchronization signal from a base station; and means for synchronizing clocks between the user equipment and the base station using a combination of sample and sub-sample timing determined based at least in part on the synchronization signal.

Another exemplary embodiment is a method. The method comprises transmitting from a base station toward a user equipment a synchronization signal. The method also comprises synchronizing clocks between the user equipment and the base station using a combination of sample and sub-sample timing determined based on at least the synchronization signal.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: transmitting from a base station toward a user equipment a synchronization signal; and synchronising clocks between the user equipment and the base station using a combination of sample and sub-sample timing determined based on at least the synchronization signal.

An exemplary computer program product includes a computer-readable storage medium bearing computer program code embodied therein for use with a computer. The computer program code includes: code for transmitting from a base station toward a user equipment a synchronization signal; and code for synchronizing clocks between the user equipment and the base station using a combination of sample and sub-sample timing determined based on at least the synchronization signal.

In another exemplary embodiment, an apparatus comprises: means for transmitting from a base station toward a user equipment a synchronization signal; and means for synchronizing clocks between the user equipment and the base station using a combination of sample and sub-sample timing determined based on at least the synchronization signal.

DETAILED DESCRIPTION OF THE DRAWINGS

Figure 1A:
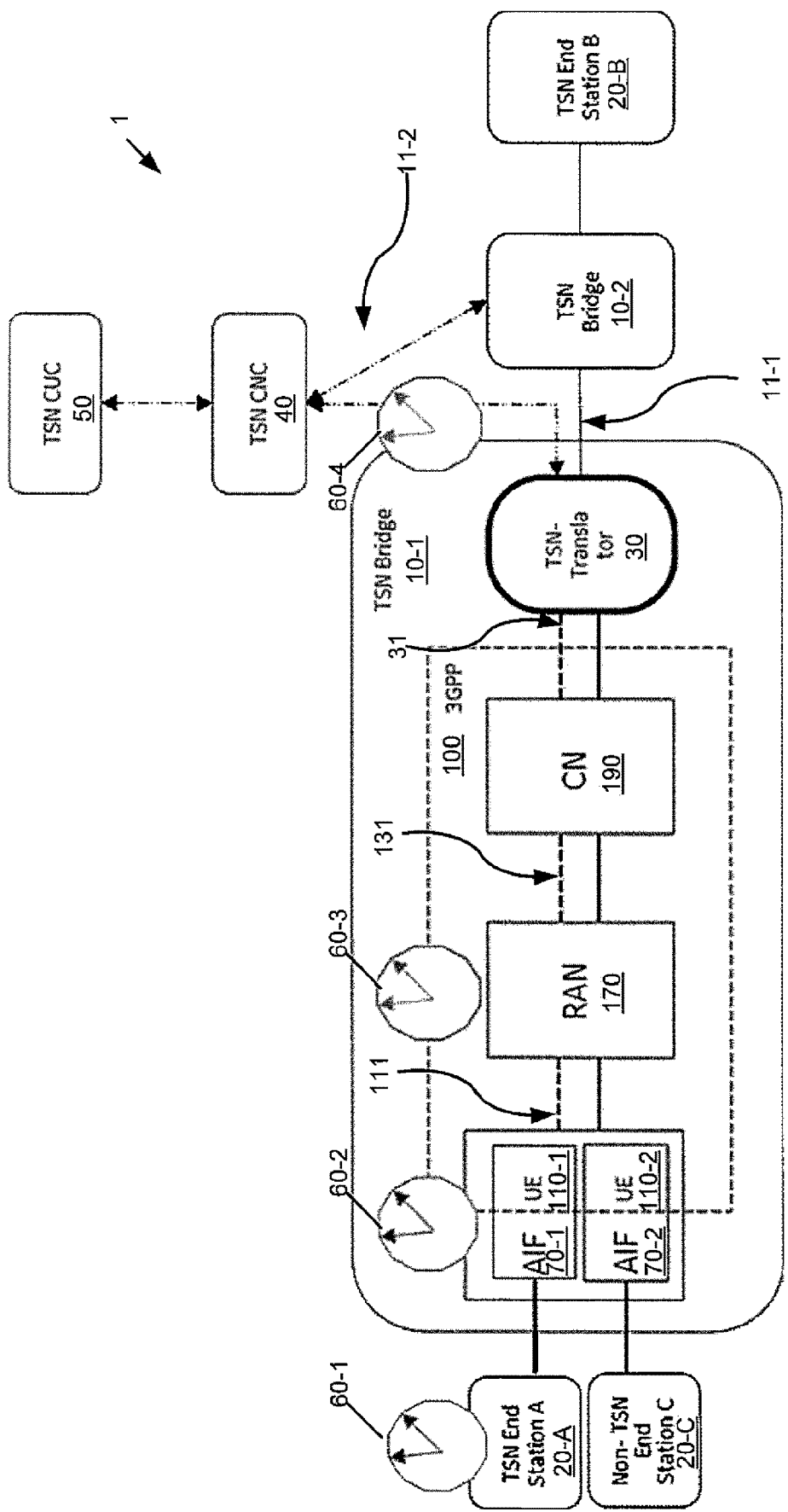
FIG. 1A is a block diagram illustrating integration of a 3GPP network into a time sensitive network, in accordance with an exemplary embodiment.

The following abbreviations that may be found in the specification and/or the drawing figures are defined as follows:
3GPP third generation partnership project
5G fifth generation
ADC analog to digital converter
AIF adaptation interface
APP application
CN core network
CNC centralized network controller
CSI RS channel state information reference signal
CUC centralized user configurator
E2E end-to-end
eNB (or eNodeB) evolved Node B (e.g., an LTE base station)
FFT fast Fourier transform
gNB (or gNodeB) base station for 5G/NR
IEEE Institute of Electrical and Electronics Engineers
IFFT inverse FFT
I/F interface
IIoT industrial Internet of things
IoT Internet of things
LLDP link layer discovery protocol
LOS line of sight
LTE long term evolution
MME mobility management entity
MPC multi path component
NCE network control element
NR new radio
N/W or NW network
PDU protocol data unit
PHY physical layer
PTP precision time protocol
QoS quality of service
RAN radio access network
Rel. release
RRH remote radio head
Rx receiver
SGW serving gateway
SIM subscriber identity module or subscriber identification module
Synch or synch synchronization
TA timing advance
TS technical specification
TSN time sensitive networking
Tx transmitter
UE user equipment (e.g., a wireless, typically mobile device)

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The rest of this disclosure is divided into sections, for ease of reference.

I. INTRODUCTION

Time sensitive networking (TSN) is currently standardized as a mechanism for communication within industrial networks. See, e.g., R. Hummer, S. Kehrer, O. Kleineberg, "TSN—Time Sensitive Networking", White Paper, Hirschmann. In TSN, a set of IEEE 802.1 protocols is applied to achieve deterministic data transmission with guaranteed low latency with time-aware devices (which should be configured properly). These protocols include IEEE 802.1AS-Rev, 802.1CB, 802.1Qcc, 802.1Qch, 802.1Qci, 802.1Qcj, 802.1CM, 802.1Qep, 802.1Qcr, 802.1AB, although IEEE P801AS-Rev/D5.0 (Jun. 12, 2017) is the most relevant for the embodiments disclosed herein.

In 2017, 3GPP started a study on communication for Automation in Vertical Domains to identify respective requirements for wireless communication. So far, neither 3GPP Rel. 15 nor Rel. 16 includes solutions on integrating 3GPP networks with TSN. The embodiments herein help to provide such solutions.

FIG. 1A illustrates an example of how a 3GPP network 100 can be integrated into a TSN based industrial network 1 in a transparent way. Here, the term "transparent" means the protocols and procedures defined in TSN are kept as they are and no change is needed for the integration. The entire 3GPP network 100, with its own protocols and procedures, is presented as part of a TSN bridge 10-1 as shown in FIG. 1A. A block diagram of an exemplary 3GPP network 100 is described in more detail below in reference to FIG. 1B.

The TSN network 1 comprises a TSN centralized user configurator (CUC) 50, a TSN (centralized network controller) CNC 40, two TSN bridges 10-1 and 10-2, and three end stations 20, of which two are TSN end stations A 20-A, B 20-B, and a third is non-TSN end station C 20-C. The TSN bridge 10-1 comprises a 3GPP network 100, a TSN translator 30, and two AIFs 70-1 and 70-2. The Adaptation Interfaces (AIFs) are also referred to as translator clients. Two new entities, namely the TSN translator 30 and TSN translator client (AIF 70), encapsulate the 3GPP network into a TSN bridge. For the TSN network 1, the 3GPP network 100 appears to be a normal TSN bridge 10 and hence, the 3GPP network is transparent.

The TSN end stations 20, the UE 110, and the AIF are three logical functions which can be realized in single or multiple devices. A typical deployment might be the following. The AIF 70 may be an APP (application) in the UE 110. UE is a device with a SIM card that enables wireless communication towards the base station (e.g., RAN 170). A single UE 110 can offer one or more ports through which the end stations 20 are connected to the wireless network and hence, the TSN network 1. The main functions of the AIFs 70 are to support TSN protocols like PTP and LLDP, and to provide TSN scheduling mechanisms at the ports offered by a corresponding UE 110. In cases of a non-TSN end station such as 20-C, the AIF 70-2 has additional functions to make the AIF compatible with the TSN network.

In more detail, one of the key considerations for TSN standardization is to have a centralized entity, named CNC 40, which collects the requirements of end-to-end communication between end stations 20 and performs scheduling centrally. The bridges 10 learn the connection information for their immediate network peer in each physical port using the link layer discovery protocol. Each TSN network 1 has a single CNC 40. In addition, there might be multiple centralized user configurators 50 (CUCs) which translate the requirements of the end-to-end communication and communicate the requirements to the CNC 40. Furthermore, the CUC 50 is responsible for configuring the end stations 20 with transmission parameters computed by the CNC 40 during the scheduling process. In FIG. 1A, the solid lines imply a data plane and the dotted lines imply the control plane. See the links 111, 131, 31, 11-1, and 11-2.

The TSN end station A 20-A is connected to a UE 110-1 via the AIF 70-1, and similarly the non-TSN end station C 20-C is connected to a UE 110-2 via the AIF 70-2. The UEs 110 are responsible to establish and handle the wireless connection service for the TSN end stations A and the non-TSN end station C. The wireless connection service contains, beside the wireless link 111 between UE 110 and RAN 170, also essential Core Network (CN) 190 element(s) providing services to provide, for example, authentication, mobility, quality of service (QoS), and the like.

For the transparent usage of the wireless connection service and to hide specific behavior of the 3GPP network 100 to the TSN network 1 and vice versa, a TSN translator 30 is introduced, which works as an intermediator between both domains. That is, the TSN translator 30 understands the TSN protocol and maps the TSN CUC 50 and TSN CNC 40 messages as well as the TSN network messages on the one hand into control and user plane messages of the 3GPP network and on the other hand into corresponding actions in a 3GPP network, e.g., to trigger the establishment of a wireless connection with guaranteed QoS and vice versa. With respect to this view, the TSN translator is placed on both sides of the 3GPP network, the UE side and the CN side. The TSN translator 30 and the TSN translator client (i.e., AIF 70) are logically part of the same translation between 3GPP and TSN networks and hence, it is beneficial that they do not act independently. Treating them as one entity allows hiding the TSN translator at the UE side to the TSN network and using the TSN translator at the CN side to represent the complete 3GPP network as a TSN bridge to the TSN Network. This simplifies especially the configuration and handling at the TSN CNC 40 and the respective TSN CUCs. The TSN translator performs the major part of the translation of the TSN protocols to 3GPP commands and procedures and vice versa. The TSN translator at the UE side acts on behalf of the TSN translator at the CN side and is therefore called TSN translator client and is illustrated as AIF 70.

The integration of the TSN translator 30 with the TSN network is performed by implementing the protocols for a TSN bridge 10, the TSN Ethernet protocol to exchange messages between a TSN bridge 10 with another TSN Ethernet bridge or TSN end station B 20-B (e.g., user plane traffic) and the protocol to exchange information with the TSN CNC 40 (e.g., control plane traffic). Additionally, the respective communication of the TSN end station A 20-A with the TSN CUC 50 is also handled via the TSN translator 30 and its TSN translator client. Note that the communication paths of the TSN CUC 50 with the TSN end stations A 20-A and B 20-B, e.g., in order to configure the end stations with the scheduling-related configuration parameters computed by the CNC 40, are not shown in FIG. 1A.

Typically, 3GPP network 100 interfaces provide a set of functions which are defined for a specific 3GPP release. Therefore, the TSN translator 30 as well as the TSN translator client (AIF 70) are designed to adapt to respective new releases. As long as a 3GPP release is not closed, 3GPP may introduce additional interfaces or adaptations to interfaces or even new functional entities which allow for optimizing or simplifying respective handling of the communication for TSN networks. An example for such an adaptation is the introduction of the new PDU session type "Ethernet" to handle Ethernet traffic. The TSN translator 30 as well as the TSN translator client (AIF 70) hide the release specifications to the TSN network 1. The same is valid for the 3GPP network 100 when the TSN network 1 introduces new functions and interface modifications.

Figure 1B:
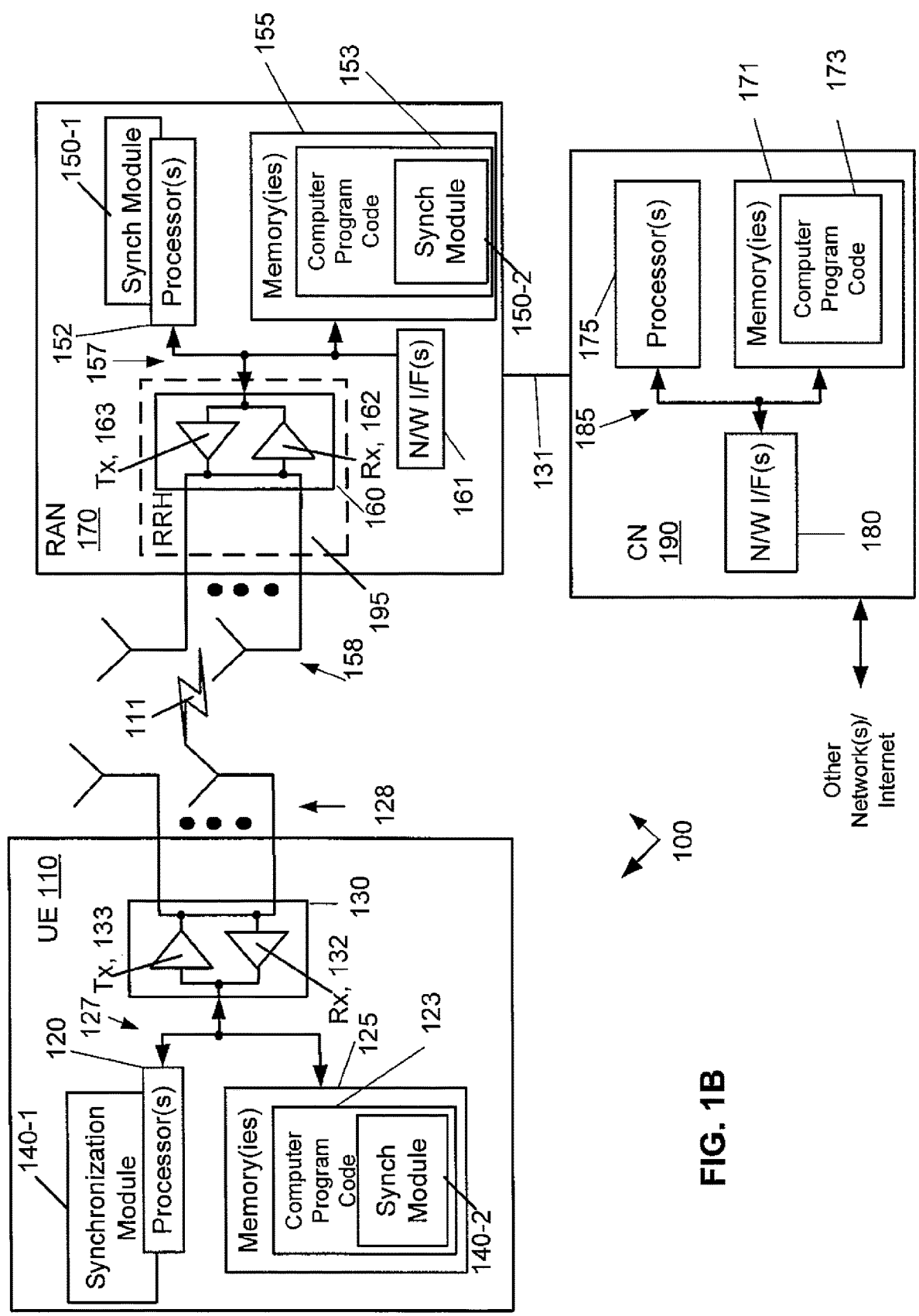
FIG. 1B is a block diagram of one possible and non-limiting exemplary 3GPP network from FIG. 1A and in which the exemplary embodiments may be practiced.

Turning to FIG. 1B, this figure shows a block diagram of one possible and non-limiting exemplary 3GPP network 100 in which the exemplary embodiments may be practiced. In FIG. 1B, a user equipment (UE) 110 is in wireless communication with the RAN 170. This example only has a single UE 110, but as shown in FIG. 1A, multiple UEs 110 may be used. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a synchronization (synch) module 140, comprising one of or both parts 140-1 and/or 140-2, which may be implemented in a number of ways. The synchronization module 140 may be implemented in hardware as synchronization module 140-1, such as being implemented as part of the one or more processors 120. The synchronization module 140-1 may be implemented also as an integrated circuit or through other hardware such as a programmable gate array. In another example, the synchronization module 140 may be implemented as synchronization module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN 170 via a wireless link 111.

The RAN 170 is a base station that provides access by wireless devices such as the UE 110 to the rest of the network 100. The RAN 170 may be a base station for 5G, also called New Radio (NR). The RAN 170 may also be an eNB (evolved NodeB) base station (also referred to as an ng-eNB), for LTE (long term evolution), or any other suitable base station. The RAN 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN 170 includes a synchronization (synch) module 150, comprising one of or both parts 150-1 and/or 150-2, which may be implemented in a number of ways. The synchronization module 150 may be implemented in hardware as synchronization module 150-1, such as being implemented as part of the one or more processors 152. The synchronization module 150-1 may be implemented also as an integrated circuit or through other hardware such as a programmable gate array. In another example, the synchronization module 150 may be implemented as synchronization module 150-2, which is implemented as computer program code 153 and is executed by the one or more processors 152. For instance, the one or more memories 155 and the computer program code 153 are configured to, with the one or more processors 152, cause the RAN 170 to perform one or more of the operations as described herein. The one or more network interfaces 161 communicate over a network such as via the link 131.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN 170 being physically in a different location from the RRH, and the one or more buses 157 could be implemented in part as fiber optic cable to connect the other elements of the RAN 170 to the RRH 195.

The 3GPP network 100 includes a core network (CN), which may include one or more of MIME (Mobility Management Entity)/SGW (Serving Gateway) functionality for LTE and/or Access and Mobility Management Function/User Plane Function functionality for 5G, and which may provide connectivity with a further network, such as a telephone network and/or a data communications network (e.g., the Internet). The RAN 170 is coupled via a link 131 to the core network (CN) 190. The link 131 may be implemented as, e.g., an NG interface for 5G, or an S1 interface for LTE, or other suitable interface for other standards. The CN 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the CN 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN 170, and other functions as described herein.

Figure 2:
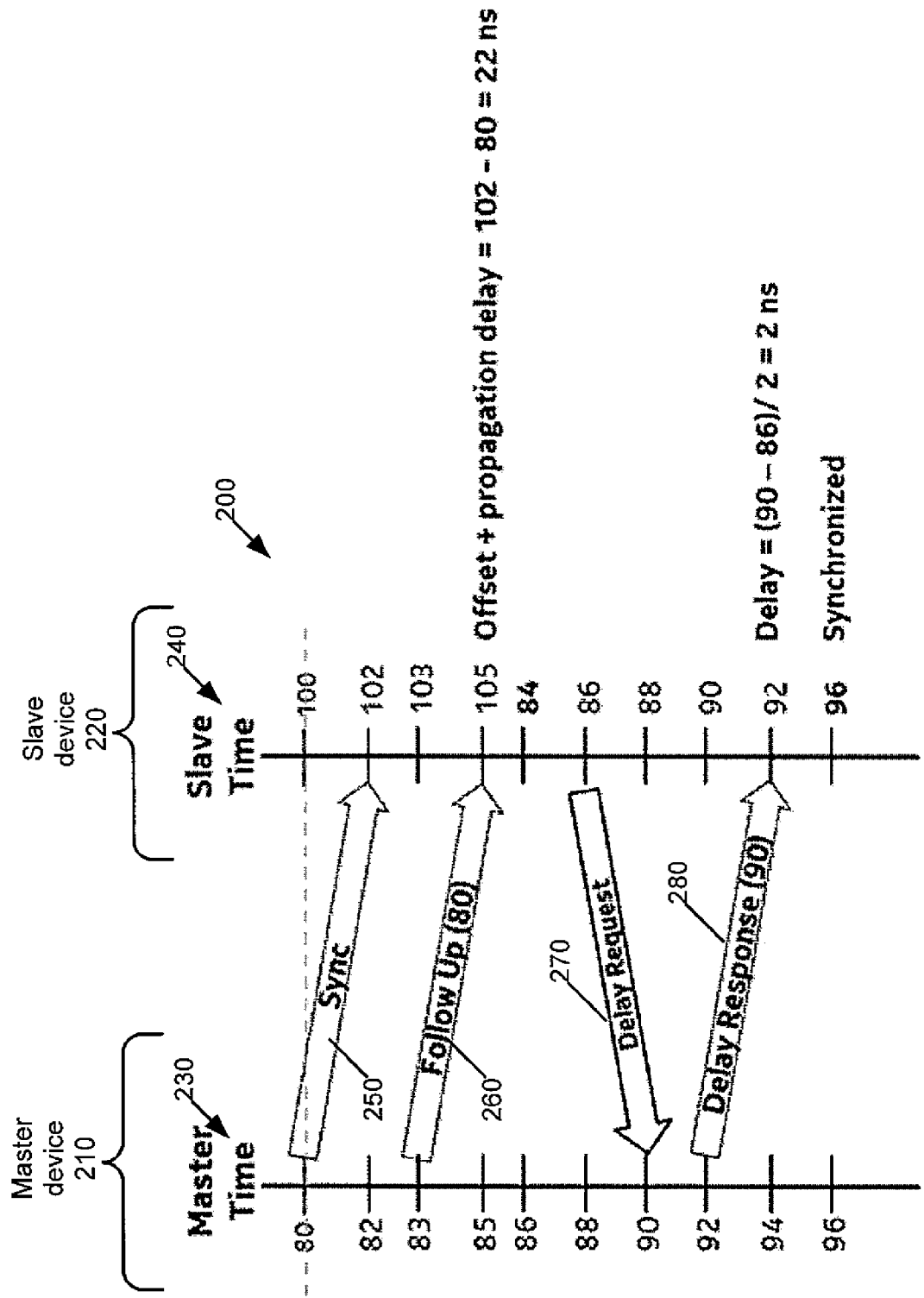
FIG. 2 is an illustration of Precision Time Protocol (PTP) process between a master device with a master time and a slave device with a slave time.

Referring back to FIG. 1A, it is assumed that the TSN master clock 60 is known at all the entities including the end station. Four copies of the master clock 60 are shown: clock 60-1 at the TSN end station A 20-A; clock 60-2 at the UEs 110; clock 60-3 at the RAN 170; and clock 60-4 at the TSN translator 30. Using the precision time protocol (PTP) (as shown in FIG. 2) the master clock 60 can be shared among the network elements in the wired TSN network. The clock 60-4 is synchronized to the clock 60-3 using PTP protocol as in TSN. Similarly, it is assumed that the clocks 60-1 and 60-2 can be synchronized (e.g., via a wired link). A task herein is to synchronize the clocks 60-2 and 60-3.

For instance, referring to FIG. 2, this figure is an illustration of a Precision Time Protocol (PTP) process 200 between a master device 210 with a master time 230 and a slave device 220 with a slave time 240. The master device 210 sends a sync signal 250 at time 80 ns (relative to the master time 230), which is received by the slave device 220 at 102 ns (relative to the slave time 240) and the slave device 220 records this time. It is noted that the signals herein may also be described as messages, as the involved signaling would also contain a message to provide the information being exchanged. The master device 210 then sends a follow up (80) signal 260 at 83 ns relative to the master time 230. The "(80)" indicates the Sync signal 250 was sent at 80 ns. This signal 260 is received by the slave device 220 at 105 ns relative to the slave time 240. The slave device 220 then calculates the overall delay, shown as offset and propagation delay as 102 ns−80 ns=22 ns. Offset is a delay caused by lack of synchronization between clocks. Propagation delay is the delay it takes a message to pass from the master device 210 to the slave device 220. The slave device 220 then resets (at time 105 ns) the slave time 240 to 83 ns.

The slave device 220 sends a delay request signal 270 at 86 ns relative to the (updated) slave time 240 and records this time. The master device 210 receives the delay request signal 270 at 90 ns relative to the master time 230, and sends a delay response (90) signal 280 at 92 ns relative to the master time 230 (where "(90)" indicates the time the master device 210 received the message 270). The slave device 220 receives this signal 280 at 92 ns relative to the updated slave time 240 and calculates the delay as (90−86)/2 or 2 ns. In the previous update step, the slave time has been subtracted by not only the offset but also by the propagation delay. To correct that, now the slave device 220 calculates the propagation delay (of 2 ns) and adds it to the current updated slave time, resulting in 92+2=94 ns. The clocks are now synchronized.

However, in order to share this clock to the end stations 20-A and 20-C (see FIG. 1A) connected to the UEs 110-1 and 110-2, respectively, the information has to be transmitted on the wireless link 111 between the RAN 170 and the UE 110. The primary and secondary synchronization symbols defined, e.g., in LTE may be used to share the clock information to the UE side. Either using a PTP procedure or using the synchronization symbols, time precision of synchronization is restricted to the precision of the sampling time. In LTE, for 20 MHz bandwidth, the sampling time is about 32 ns. Synchronization of a wireless device to a fraction of nanoseconds is open for 3GPP systems.

II. OVERVIEW

One exemplary idea is to increase the time resolution of the samples received for synchronization. This increase in resolution is achieved by either using the local oscillator clock for synchronization which is running in case of LTE at 2.5 GHz providing nanosecond time resolution and/or resolving the sub-samples in the baseband, thereby achieving high temporal resolution. It is noted that the terms "local oscillator", "local oscillator clock" and "clock" are considered to be the same herein, for purposes of this disclosure. After increasing the time resolution, the Precision Time Protocol (PTP) process can be used to synchronize the UE 110 and RAN 170. Below, these two proposals are explained.

1) The first proposal is to use a local oscillator clock. In this method, the UE and the RAN access the LO clock to identify the current time in the system. A counter is added to both the devices to keep track of the time. When a packet is transmitted the counter value is added into the field that may be created in a PHY frame for synchronization purpose. As this additional field may be introduced in a PHY frame, standardization would be helpful. The UE and the RAN perform a PTP process to synchronize the counters with each other.

2) The second proposal is to resolve sub-samples. In this method, the sub-samples of the baseband signal are resolved to obtain an increased time resolution of the synchronization signals. Consider the following example. Assume the clocks need to be synchronized at a resolution of one nanosecond. The sampling time in LTE for 20 MHz bandwidth is about 32 nanoseconds (ns), which means there is 32 ns between each sample. Therefore 31 sub-samples between two samples need to be resolved. Let the clock offset between the UE and gNB be N samples and x sub-samples, i.e., 32*N÷x nanoseconds. The synchronization may be performed in two steps: sub-sample synchronization and sample synchronization.

Figure 3:
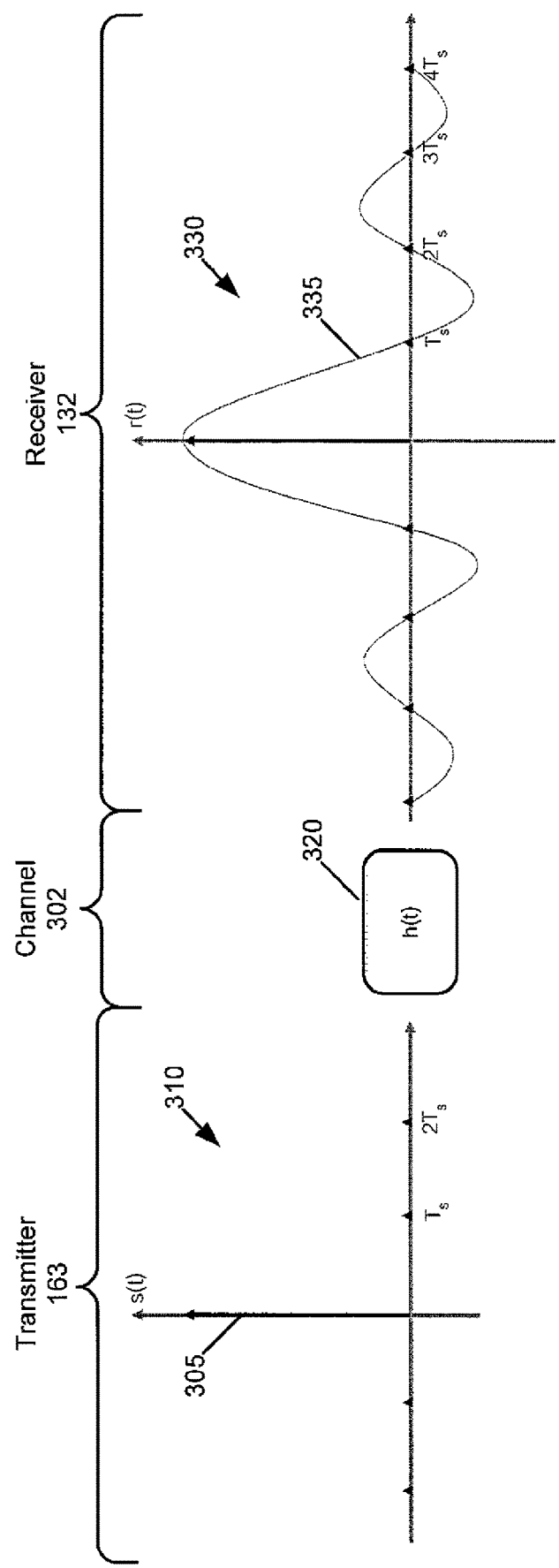
FIG. 3 illustrates a transmission of Dirac pulse in a band-limited system with zero sub-sample clock offset.
Figure 4:
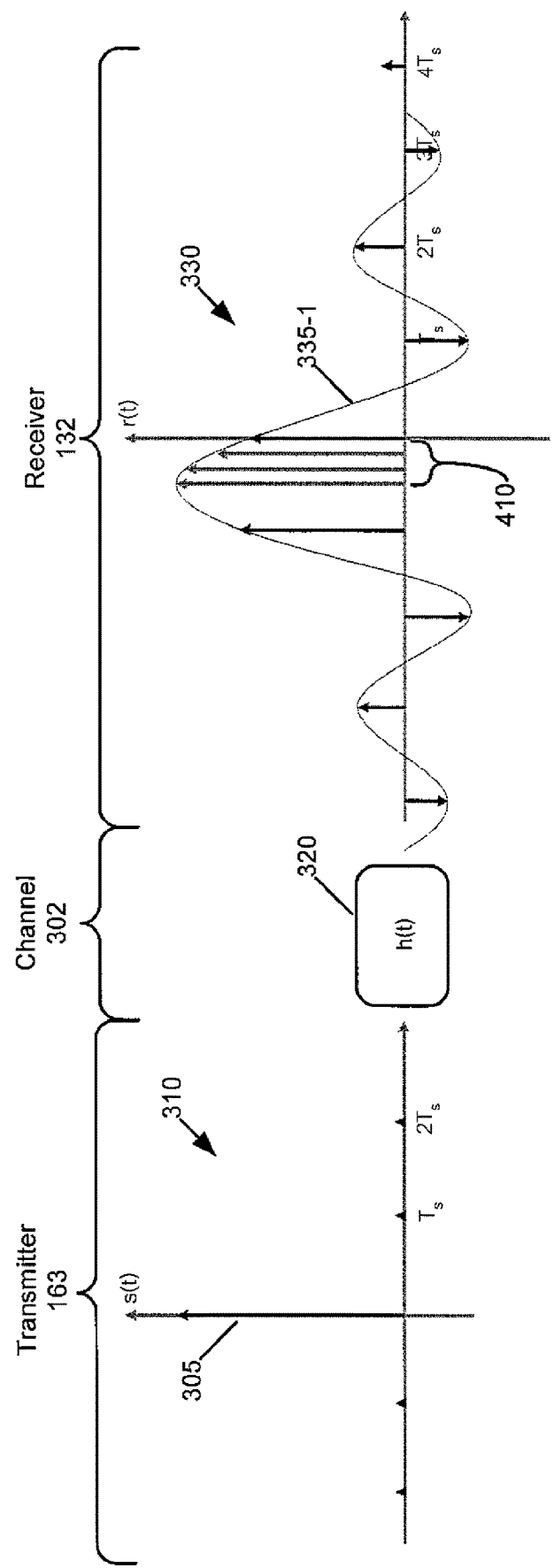
FIG. 4 illustrates a transmission of Dirac pulse in a band-limited system with a clock offset of three sub-samples.

First, the sub-sample synchronization is performed by exploiting the fact that the transmitted signal is limited to the bandwidth, i.e., a Dirac pulse transmitted with limited bandwidth will turn to be a sync pulse at the receiver. If the sub-samples of the transmitter and receiver are synchronized, then at the sampling instance corresponding to the Dirac pulse, the maximum of the sync signal occurs and the neighboring samples will correspond to the zero crossings of the sync signal. This is shown in FIG. 3, which illustrates a transmission of Dirac pulse in a band-limited system with zero sub-sample clock offset. A Dirac pulse 305 (illustrated in graph 310) is transmitted by a transmitter 163 (e.g., of the RAN 170), and the receiver 32 (e.g., of a UE 110) receives sync pulse 335 (illustrated in graph 330) after the pulse 305 passes through the channel 302 with the channel transfer function H(f) and according channel impulse response h(t) 320. If there is a clock offset of x sub-samples, then sampling point is shifted by the time corresponding to x sub-samples and the neighboring samples will have non-zero values as shown in FIG. 4, which illustrates a transmission of Dirac pulse 305 in a band-limited system with a clock offset 410 of three sub-samples (i.e., x=3), which is seen by the sync pulse 335-1. By measuring the time shift, the sub-sample offset can be identified.

The delay observed in FIG. 4 is a combination of the clock offset and the propagation delay. Let the propagation delay be Np samples and xp sub-samples. Let the clock offset be No samples and xo sub-samples. Then the total delay is (No+Np) samples and (xo+xp) sub-samples. During the sub-sample synchronization xo+xp is identified by looking at the delay as shown in FIG. 4. However, this delay is a combination of the offset between the clocks and the propagation delay. To resolve the individual components, the Dirac pulse is transmitted in the reverse direction (UE 110 to RAN 170). For the PTP protocol, the propagation delay from master to slave and from slave to master are assumed to be symmetric i.e., the channel is symmetric. Assuming a symmetric channel, the resulting delay is (−xo+xp). The −xo occurs because for the transmission from the UE to the RAN, it is the clock offset of the RAN versus the UE; and for the transmission from the RAN to the UE, it is the clock offset of the UE versus the RAN. This modifies the sign on xo for these different directions.

From the above two equations, the clock offset can be determined. Note that sum and difference of the delays are available at the UE 110 and RAN 170 respectively. This information should be shared between the UE 110 and RAN 170 to calculate the clock offset. This sharing may be done using a standardized field in, e.g., a PHY frame or may be done at the application layer. In case of asymmetric channels, the asymmetric factor needs to be estimated for, e.g., by transmitting the delay request packet again from the slave to the master after updating the slave clock using previously estimated propagation delay.

After synchronizing the clocks to the correct sub-samples, the samples can be synchronized using the PTP process described in FIG. 2.

III. ADDITIONAL DETAILS

Now that an overview has been described, additional details are provided.

III. A. Using local oscillator clock

Figure 5:
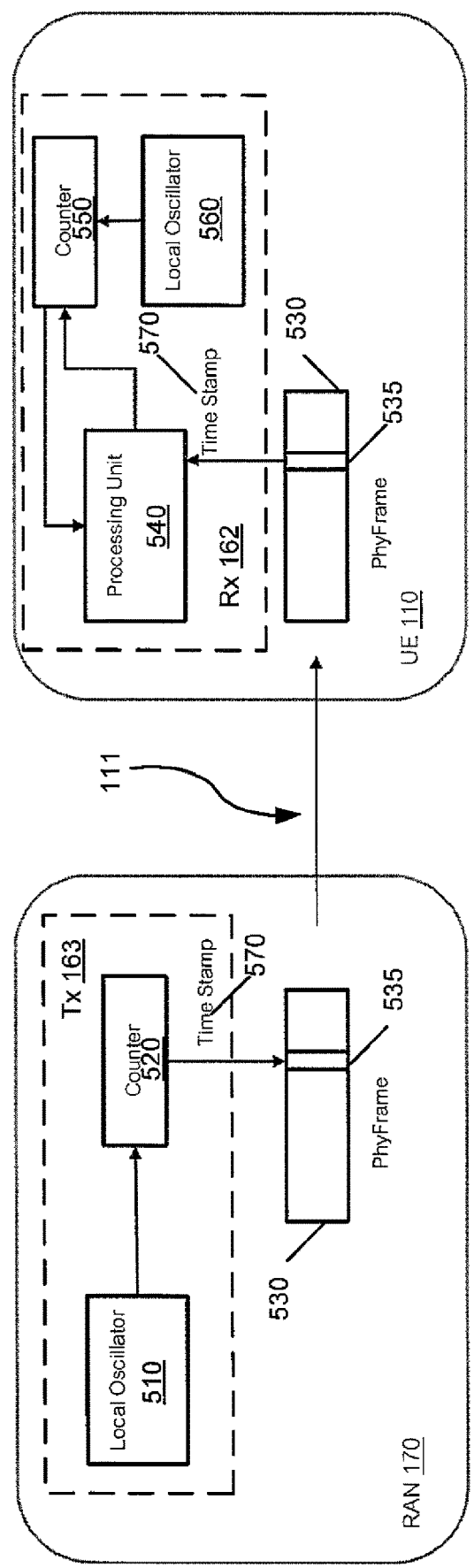
FIG. 5 illustrates clock synchronization using local oscillators, in accordance with an exemplary embodiment.

This section describes more details about using a local oscillator clock. Turn to FIG. 5, which illustrates clock synchronization using local oscillators, in accordance with an exemplary embodiment. In this figure, the RAN 170 comprises a local oscillator 510 and a counter 520. These may be implemented in the transmitter (Tx) 163. The counter 520 may also be implemented in on or more processors 152 of the RAN 170, or in other circuitry. The UE 110 comprises a processing unit 540, a counter 550, and a local oscillator 560. These may be implemented in the receiver (Rx) 162. For instance, the processing unit 540 (and/or the counter 550) may be part of the one or more processors 120, or part of other circuitry in the UE 110.

For synchronization using a local oscillator 510 or 560, a counter 520 or 550 is respectively introduced at the RAN 170 and at the UE 110. First, the RAN 170 while transmitting the sync signal 250 adds the time stamp 570 based on the counter state in the corresponding field 535 in the PHY frame 530. The time stamp 570 could also be added in a follow up message 260 as in the PTP process shown in FIG. 2. The UE 110, on receiving the time stamp 570, updates its counter 550 with an updated counter value. The updated counter value includes the propagation delay. The UE 110 identifies the propagation delay by sending a delay request similar to the delay request 270 shown in FIG. 2. It is to be noted that the UE 110, after identifying the clock offset and propagation delay, knows the master clock 60 in the system. This clock is used to obtain/deliver the TSN streams at right time instant from/to the TSN end stations 20. However, the transmissions from the UE 110 to the RAN 170 are not necessarily synchronized to this master clock 60.

Additionally, due to potential UE mobility, the synchronization might be needed more often and adapted to the UE velocity. Furthermore, the subsampling works for one specific MPC—potentially the LOS MPC. In case this MPC is, e.g., blocked, a direct re-synchronization might be triggered. Even more, the UE 110 might establish the relative sub-sample timing for more than only the strongest MPC. In that case, the UE might directly fall back to this MPC in case the strongest MPC is being blocked.

III. B. Resolving sub-samples

This section describes more details about resolving sub-samples, in terms of an overall process. In particular, this section starts with how sub-sample shift may be identified, and then describes an overall process for resolving the sub-sample and sample shifts due to clock offset and propagation delay.

In order to resolve the sub-samples, the Dirac signal should be a sequence with a very good autocorrelation property. The CSI RS covering the full bandwidth may be used as the reference signal. One may consider the primary and secondary synchronization signals used in, e.g., LTE for this purpose (with corresponding restriction in time resolution due to small bandwidth).

Figure 6:
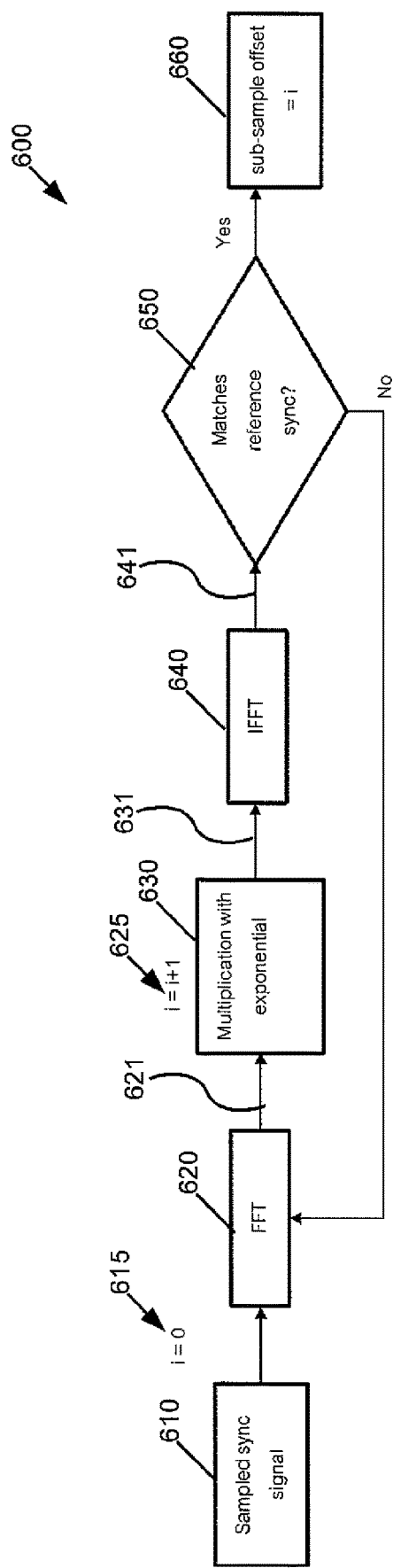
FIG. 6 illustrates an iterative algorithm to identify the sub-sample shift, in accordance with an exemplary embodiment.

Referring to FIG. 6, this figure illustrates an iterative algorithm 600 to identify the sub-sample shift, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with an exemplary embodiment. This figure could be performed by the UE 110, e.g., under control of the synchronization module 140 at least in part, or by the RAN 170, e.g., under control of the synchronization module 150 at least in part.

At the receiver, the sub-sample shift (illustrated by reference 410 in FIG. 4) can be identified as follows, as indicated by algorithm 600. First, the sampled sync pulse 610 (e.g., a sampled version of the sync pulse 335-1 from FIG. 4) is transformed to the frequency domain using an appropriately sized FFT 620, which could be implemented as part of a processor in either hardware or software, or implemented as circuitry separate from the processor. Implementation is vendor specific. Note that the variable i is set to zero (i+0), as shown by reference 615, before the FFT 620. The (frequency domain) result 621 is then is multiplied by an exponential function in block 630. The exponential function corresponds to a time shift of one sub-sample. The exponential function is a linear phase slope over the frequency subsamples, i.e., a $e^{(jan\Delta f\pi)}$, where $\Delta f$ is the subcarrier spacing, n is the subcarrier index, and a defines the strength of the slope. Additionally, the variable i is incremented (i=1+1), as shown by reference 625. Then the result 631 is transformed to the time domain using an IFFT function 640. The resultant (time domain) signal 641 is the sync signal 335-1 shifted by one sub-sample and then sampled with the sampling frequency. This process is repeated until the sync signal 335 (with no clock offset) in FIG. 3 is obtained. Specifically, in block 650, it is determined if the signal 641 matches the sync signal 335 (with no clock offset). The matching may be within some threshold or the iteration fitting the best per an algorithm. If not (block 650=No), the flow proceeds to block 620, where another FFT 620 is performed. If the signal 641 matches the sync signal 335 (with no clock offset) (block 650=Yes), the sub-sample clock offset is assumed to be the variable i, which is the relative subsampling timing. The number of iterations corresponds to the number of sub-samples by which the synch signal has been shifted.

Figure 7:
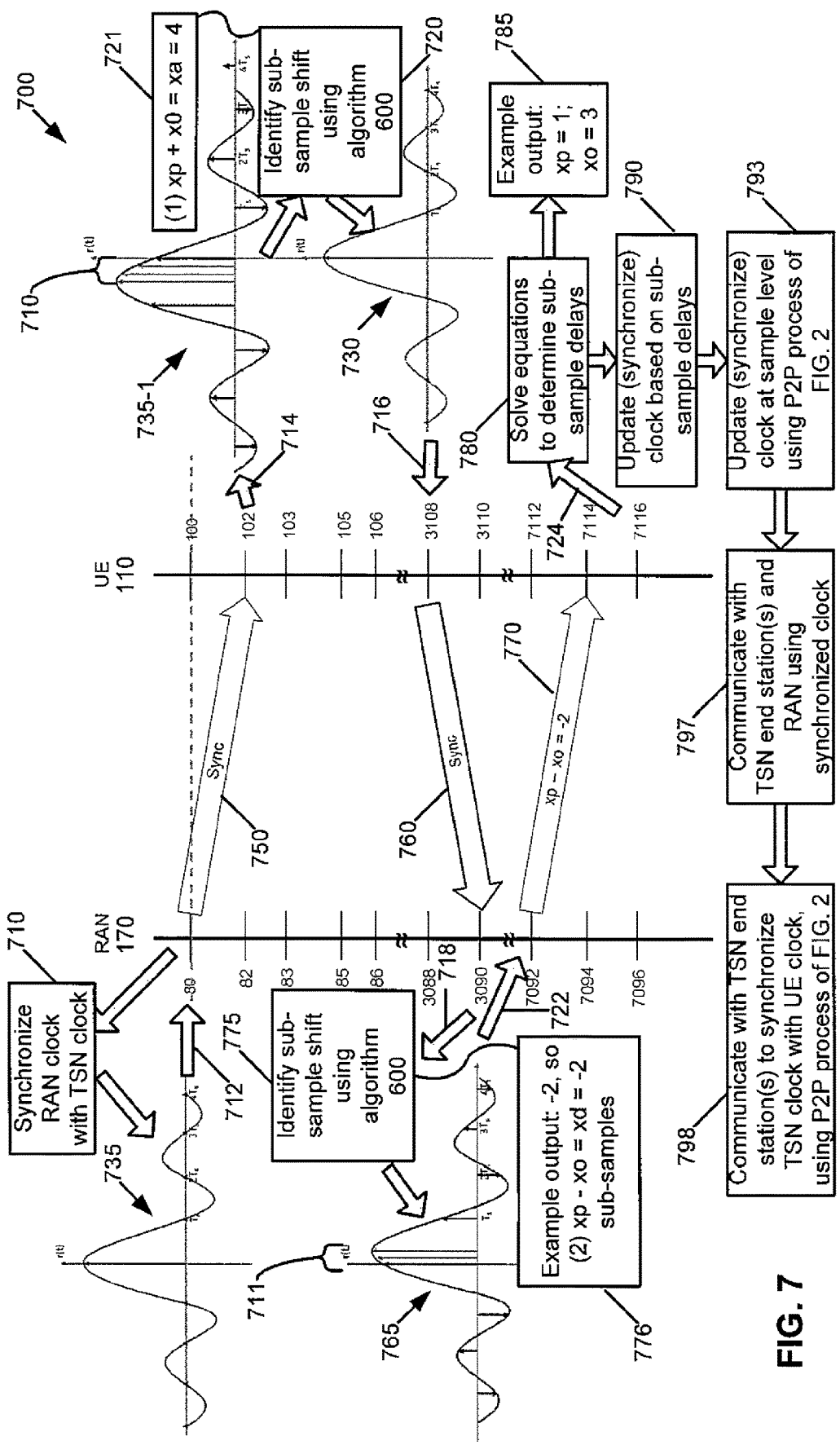
FIG. 7 illustrates a process for resolving the sub-sample and sample shifts due to clock offset and propagation delay.

The procedure described above (as shown in FIG. 6) is used in the following to identify sub-sample shift due to the propagation delay and clock offset as shown in FIG. 7. This figure illustrates a synchronization process 700 for resolving the sub-sample and sample shifts due to clock offset and propagation delay, and is both a signaling diagram and a flowchart. The operations in this figure also illustrate an exemplary method or methods, results of execution of computer program instructions embodied on a computer readable memory, functions performed by logic implemented in hardware, and/or interconnected means for performing functions in accordance with an exemplary embodiment. This figure is performed by the UE 110, e.g., under control of the synchronization module 140 at least in part, and by the RAN 170, e.g., under control of the synchronization module 150 at least in part. It is noted that signals 750, 760, 770 and corresponding operations may be thought of a new P2P process used for resolving the sub-sample shifts due to clock offset and propagation delay.

In the example shown in FIG. 7, the UE clock 60-2 is offset by No=20 samples and xo=3 sub-samples. The propagation delay is Np=2 samples and xp=1 sub-samples. The two vertical lines on the RAN side and UE side denote the sample axis. Note that the procedure is used to identify the sub-sample clock offset (and later the sample clock offset) and hence the sample indices are not changed during the protocol (until later). The sample indices imply the sample instant that corresponds to the Dirac pulse.

At some point, the RAN 170 synchronizes (see block 710) its clock 60-3 with the TSN clock 60-4. It is assumed this is performed using the PTP process shown in FIG. 2 and the synchronization occurs between the RAN 170, the CN 190, the TSN translator 30, and other the TSN CNC 40.

At 80 ns a Dirac pulse 305 is transmitted (see reference 712) from the RAN 170, e.g., via the sync signal 750. The band-limited equivalent of this Dirac is shown by the sync signal 735 in FIG. 7 and is created by the RAN 170. The UE receives (see reference 714, received at 102 ns) a sync signal version of the Dirac pulse 305, where the sync version is illustrated by reference 735-1. At the UE 110, the peak of the received sync signal 735-1 is shifted by four (4) sub-samples 710 in this example. This shift of 4 sub-samples 710 originates from the sum of the sub-sample shift from propagation delay and the sampling clock offset (i.e., 1+3). Note that in contrast to the conventional PTP process 200 shown in FIG. 2, the information (e.g., in follow up signal 260) about the time at which the Dirac pulse is transmitted is not needed for the sub-sample synchronization. Hence, a follow up signal 260 is not necessary. The UE 110 performs in block 720 identification of the sub-sample shift by using the algorithm 600 to shift the received sync signal 735-1 (with a shift of 4) to the sync signal 730 with zero clock offset. This determines that the total shift xa (of 4 sub-samples) is equal to xp+xo. See block 721, where a first equation (1) is xp+xo=xa=4. The variable xa is marked as such because the delays are additive.

To resolve the xp and xo out of the identified 4 sub-sample shift 710, the UE 110 sends (see reference 716, occurring at about 3108 ns) its sync signal 760 to the RAN 170. In response to reception (see reference 718 occurring at 3090 ns) of this signal 760, the RAN 170 observes a negative shift 711 of 2 sub-samples, as illustrated by sync signal 765. That is, the RAN 170 identifies the sub-sample shift by performing the algorithm 600 in block 775 and determines the example output (see block 776) of −2 (negative 2) sub-samples as xd, which means that xp−xo=−2. That is, equation (2) is xp−xo=xd=−2. The variable xd is called as such because the delays are differential. The RAN 170 feeds back (see reference 722) this information to the UE 110 via the signaling 770 (with an indication that xp−xo=−2). The UE receives this signaling (see reference 724) at about the 7114 ns time. The UE can solve the two equations (xp+xo=4 from the UE and xp−xo=−2 from the RAN) to identify xp=1 and xo=3. More specifically, the UE 110 in block 780 solves these equations (1) and (2) to determine sub-sample delays, resulting in output (see block 785) of xp=1 and xo=3. Now the UE 110 can synchronize its clock 60-2 to that (clock 60-3) of the RAN 170 at a sub-sample level, i.e., its sampling instance matches with that of the RAN 170. However, the absolute value of the sample position is not known to the UE 110. This topic will be discussed directly in the following and further below.

Once the sub-sample shift is determined, the clock 60-2 at the UE can be adjusted. See block 790, where the UE 110 updates its clock 60-2 based on sub-sample delays. This results in synchronization at a sub-sample level of its clock 60-2 with the clock 60-3 used by the RAN 170. In addition, the sampling time of the ADC could be adjusted but may not be necessary, because the UE 110 needs to only know the master clock 60 in the system to timely receive/deliver the packets to the industrial devices and the UE 110 can still transmit to the RAN 170 with a sub-sample shift in the sampling instant. The synchronization of different UEs 110 to the RAN 170 to guarantee orthogonality is implemented by a TA mechanism, which is a well-known technique for mobile radio. TA works also on sample and not sub-sample timing. However, the above proposed mechanism could be as an enhancement to the TA to increase the precision of synchronization.

In systems with high mobility, xp can be updated more often than the xo. In this case, a single sync transmission (e.g., from the RAN to the UE) may be sufficient given xo remains constant for a longer period than xp.

Now, the PTP process 200 shown in FIG. 2 may be used to synchronize the samples of the RAN 170 and the UE 110. See block 793, where the UE 110 updates its clock 60-2 at the sample level using P2P protocol of FIG. 2. This synchronizes the UE's clock 60-2 with the RAN's clock 60-3 at a sample level (e.g., in samples of 32 ns in the LTE example being used).

In block 797, the UE 110 communicates with end station(s) 20 and the RAN 170 using its synchronized clock 60-2. One technique the UE 110 may use is to communicate (see block 797) with TSN end station 20-A or non-TSN end station 20-C to synchronize the TSN clock 60-1 with the UE clock 60-2, using the P2P protocol of FIG. 2. Other communications, such as with data and/or control information are also possible.

III. C. Variations

One variation is the sub-sample synchronization and sample synchronization can be performed simultaneously. In this case, the information about the time instant at which the sync signal is transmitted from the RAN needs to be added to the procedure in FIG. 7 either directly to the sync signal 750 or using a follow up message 260. Further, as a response to the sync message 760 from the UE 110, the RAN 170 has to add (e.g., to signal 770) the time instant at which the RAN received the sync message.

Another variation is that the sub-sample synchronization may be combined with the local-oscillator-based synchronization to improve the estimation accuracy.

III D. Additional Notes

Exemplary proposed sub sampling mechanisms have been described for a frequency flat radio channel having only a single multi path component (MPC). In case of more realistic frequency selective radio channels, where the channel impulse response comprises more than one MPC, the proposed algorithms could be applied to the strongest MPC. Often the strongest MPC is not directly observable, but with super resolution techniques like profiling, this MPC can be estimated quite reliably.

For typical mobile radio systems, there is a further issue regarding the sampling of the Rx-signals at the receiver ends, where typically a sync circuit is being used to align the Rx-signal to the Rx-window of the UE or the RAN. Especially for moving UEs, there will quite often be a resynchronization, i.e., the sample timing will be switched by one or multiple sample instances. For this application, these resynchronization events and their according time shifts should be identified and corrected. In principle, the UEs can know the resynchronization events and their impact, which would allow the UEs to provide these PHY layer events to the higher application layers. In case UEs do not provide such information to the higher layers, then the proposed enhanced TSN protocol could check the Rx-signal with respect to phase jumps as a result of these resynchronization events, and correct their impact of x sample shifts accordingly.

IV. FURTHER EXAMPLES

Without in any way limiting the scope, interpretation, or application of the claims appearing below, a technical effect of one or more of the example embodiments disclosed herein is integration of 3GPF and similar systems with time sensitive networking. Another technical effect of one or more of the example embodiments disclosed herein is a determination and correction of clock timing to the sub-sample level. That is, the time resolution of the samples received for synchronization is increased, thereby achieving high temporal resolution suitable for applications such as industrial applications.

Additional examples include the following.

Example 1. A method, comprising:
receiving at a user equipment a synchronization signal from a base station; and
synchronizing by the user equipment clocks between the user equipment and the base station using a combination of sample and sub-sample timing determined based at least in part on the synchronization signal.

Example 2. The method of example 1, wherein the synchronizing clocks between the user equipment and the base station using the combination of sample and sub-sample timing further comprises:
identifying at the user equipment a first sub-sample shift of the synchronization signal, the first sub-sample shift being from an offset of the synchronization signal to zero offset for the synchronization signal, the first sub-sample shift caused by addition of a propagation delay in sub-samples between the user equipment and the base station to a clock offset in sub-samples between a clock at the user equipment and a clock at the base station;

sending by the user equipment an other synchronization signal toward the base station;

receiving, from the base station and responsive to the other synchronization signal, an indication of a second sub-sample shift, the second sub-sample shift caused by a difference between the propagation delay in sub-samples and the clock offset in sub-samples;

calculating by the user equipment a sub-sample clock delay based on the addition and difference;

synchronizing by the user equipment the clock at the user equipment with the clock at the base station by applying by the user equipment the sub-sample clock delay to the clock at the user equipment.

Example 3. The method of example 1 or 2, wherein:

the user equipment and the base station are part of a first network; and the method further comprises communicating by the user equipment with a station in a second, different network at least by using the synchronized clock at the user equipment.

Example 4. The method of example 3, wherein the first network uses third generation partnership protocols, the user equipment communicates with a station in a second, different network, and the second network uses protocols for time sensitive networking.

Example 5. The method of any one of examples 2 to 4, wherein:

the synchronizing clocks between the user equipment and the base station using the combination of sample and sub-sample timing further comprises synchronizing at a sample level the clock at the user equipment using a precision time protocol process performed between the user equipment and the base station.

Example 6. The method of example 5, wherein:

communicating by the user equipment further comprises communicating with the station in the second, different network at least by using the synchronized clock that has been synchronized at both the sub-sample level and the sample level.

Example 7. The method of example 6, further comprising communicating by the user equipment with the station to synchronize a clock used by the station with clock at the user equipment, using the precision time protocol process.

Example 8. The method of any of examples 2 to 7, wherein identifying at the user equipment a first sub-sample shift of the synchronization signal further comprises:

sampling the synchronization signal;

performing a fast Fourier transform on the sampled synchronization signal to create a first result;

multiplying the first result with an exponential function that corresponds to a time shift of one sub-sample to create a second result;

performing an inverse fast Fourier transform on the second result to create a time-domain result;

performing the fast Fourier transform, the multiplying, and performing the inverse fast Fourier transform while keeping track of a number of sub-samples the synchronization signal has been time shifted, until the time domain result matches a synchronization signal with no offset; and setting the first sub-sample shift as the number of sub-samples the synchronization signal has been time shifted.

Example 9. The method of any of examples 2 to 8, wherein:

a first equation for the first sub-sample shift is $xa=xp+xo$, where xa is the first sub-sample shift, xp is the propagation delay in sub-samples between the user equipment and the base station, and xo is the clock offset in sub-samples between the clock at the user equipment and the clock at the base station;

a second equation for the second sub-sample shift is $xd=xp-xo$, where xd is the second sub-sample shift; and calculating by the user equipment a sub-sample clock delay based on the addition and difference further comprises performing the calculating using the first and second equations.

Example 10. A method, comprising:

transmitting from a base station toward a user equipment a synchronization signal; and synchronizing clocks between the user equipment and the base station using a combination of sample and sub-sample timing determined based on at least the synchronization signal.

Example 11. The method of example 10, wherein the synchronization signal is useful for calculation by the user equipment of a first sub-sample shift, and wherein the synchronizing clocks using the combination of sample and sub-sample timing comprises:

receiving by the base station and from the user equipment an other synchronization signal;

identifying at the base station a second sub-sample shift of the other synchronization signal, the second sub-sample shift being from an offset of the other synchronization signal to zero offset for the other synchronization signal, the second sub-sample shift caused by a difference between a propagation delay in sub-samples between the user equipment and the base station and a clock offset in sub-samples between a clock at the user equipment and a clock at the base station; and transmitting, from the base station and toward the user equipment, an indication of a second sub-sample shift, the second sub-sample shift useful for the user equipment to synchronize the clock at a sub-sample level at the user equipment with the clock at the base station.

Example 12. The method of example 10 or 11, wherein:

the synchronizing clocks using the combination of sample and sub-sample timing further comprises using a precision time protocol process between the base station and the user equipment to synchronize the clock at a sample level at the user equipment.

Example 13. The method of any of examples 10 to 12, wherein:

the user equipment and the base station are part of a first network; and the method further comprises, prior to the transmitting toward the user equipment the synchronization signal, using a precision time protocol process between the base station and a second, different network to synchronize the clock at the base station with a clock in the second network.

Example 14. The method of example 13, wherein the first network uses third generation partnership protocols and the second network uses protocols for time sensitive networking.

Example 15. A computer program, comprising code for performing any of methods 1 to 14, when the computer program is run on a processor.

Example 16. The computer program according to example 15, wherein the computer program is a computer program product comprising a computer-readable medium bearing computer program code embodied therein for use with a computer.

Example 17. An apparatus, comprising:

means for receiving at a user equipment a synchronization signal from a base station; and means for synchronizing by the user equipment clocks between the user equipment and the base station using a combination of sample and sub-sample timing determined based at least in part on the synchronization signal.

Example 18. The apparatus of example 17, wherein the means for synchronizing clocks using the combination of sample and sub-sample timing further comprises:

means for identifying at the user equipment a first sub-sample shift of the synchronization signal, the first sub-sample shift being from an offset of the synchronization signal to zero offset for the synchronization signal, the first sub-sample shift caused by addition of a propagation delay in sub-samples between the user equipment and the base station to a clock offset in sub-samples between a clock at the user equipment and a clock at the base station;

means for sending by the user equipment an other synchronization signal toward the base station;

means for receiving, from the base station and responsive to the other synchronization signal, an indication of a second sub-sample shift, the second sub-sample shift caused by a difference between the propagation delay in sub-samples and the clock offset in sub-samples;

means for calculating by the user equipment a sub-sample clock delay based on the addition and difference;

means for synchronizing by the user equipment the clock at the user equipment with the clock at the base station by applying by the user equipment the sub-sample clock delay to the clock at the user equipment.

Example 19. The apparatus of example 17 or 18, wherein:

the user equipment and the base station are part of a first network; and the apparatus further comprises means for communicating by the user equipment with a station in a second, different network at least by using the synchronized clock at the user equipment Example 20. The apparatus of example 19 wherein the first network uses third generation partnership protocols, the user equipment communicates with a station in a second, different network, and the second network uses protocols for time sensitive networking.

Example 21. The apparatus of any one of examples 18 to 20, wherein:

the means for synchronizing clocks using the combination of sample and sub-sample timing further comprises means for synchronizing at a sample level the clock at the user equipment using a precision time protocol process performed between the user equipment and the base station.

Example 22. The apparatus of example 21, wherein:

the means for communicating by the user equipment further comprises means for communicating with the station in the second, different network at least by using the synchronized clock that has been synchronized at both the sub-sample level and the sample level.

Example 23. The apparatus of example 22, further comprising means for communicating by the user equipment with the station to synchronize a clock used by the station with clock at the user equipment, using the precision time protocol process.

Example 24. The apparatus of any of examples 18 to 23, wherein the means for identifying at the user equipment a first sub-sample shift of the synchronization signal further comprises:

means for sampling the synchronization signal;

means for performing a fast Fourier transform on the sampled synchronization signal to create a first result;

means for multiplying the first result with an exponential function that corresponds to a time shift of one sub-sample to create a second result;

means for performing an inverse fast Fourier transform on the second result to create a time-domain result;

wherein the means for performing the fast Fourier transform, the means for multiplying, and the means for performing the inverse fast Fourier transform are performed while keeping track of a number of sub-samples the synchronization signal has been time shifted, and are performed until the time domain result matches a synchronization signal with no offset; and means for setting the first sub-sample shift as the number of sub-samples the synchronization signal has been time shifted.

Example 25. The apparatus of any of examples 18 to 24, wherein:

a first equation for the first sub-sample shift is $xa=xp+xo$, where $xa$ is the first sub-sample shift, $xp$ is the propagation delay in sub-samples between the user equipment and the base station, and $xo$ is the clock offset in sub-samples between the clock at the user equipment and the clock at the base station;

a second equation for the second sub-sample shift is $xd=xp-xo$, where $xd$ is the second sub-sample shift; and the means for calculating by the user equipment a sub-sample clock delay based on the addition and difference further comprises means for performing the calculating using the first and second equations.

Example 26. An apparatus, comprising:

means for transmitting from a base station toward a user equipment a synchronization signal; and means for synchronizing clocks between the base station and the user equipment using a combination of sample and sub-sample timing determined based on at least the synchronization signal.

Example 27. The apparatus of example 26, wherein the synchronization signal is useful for calculation by the user equipment of a first sub-sample shift, and wherein the means for synchronizing clocks using the combination of sample and sub-sample timing comprises:

means for receiving by the base station and from the user equipment an other synchronization signal;

means for identifying at the base station a second sub-sample shift of the other synchronization signal, the second sub-sample shift being from an offset of the other synchronization signal to zero offset for the other synchronisation signal, the second sub-sample shift caused by a difference between a propagation delay in sub-samples between the user equipment and the base station and a clock offset in sub-samples between a clock at the user equipment and a clock at the base station; and means for transmitting, from the base station and toward the user equipment, an indication of a second sub-sample shift, the second sub-sample shift useful for the user equipment to synchronize the clock at a sub-sample level at the user equipment with the clock at the base station.

Example 28. The apparatus of example 26 or 27, wherein:

the means for synchronizing clocks using the combination of sample and sub-sample timing further comprises means for using a precision time protocol process between the base station and the user equipment to synchronize the clock at a sample level at the user equipment.

Example 29. The apparatus of any of examples 26 to 28, wherein:

the user equipment and the base station are part of a first network; and the apparatus further comprises means for using, prior to the transmitting toward the user equipment the synchronization signal, a precision time protocol process between the base station and a second, different network to synchronize the clock at the base station with a clock in the second network.

Example 30. The apparatus of example 29, wherein the first network uses third generation partnership protocols and the second network uses protocols for time sensitive networking.

Example 31. An apparatus, comprising:
at least one processor; and
at least one memory including computer program code,
the at least one memory and the computer program code configured, with the at least one processor, to cause the apparatus to perform operations comprising:
receiving at a user equipment a synchronization signal from a base station; and
synchronizing clocks between the user equipment and the base station using a combination of sample and sub-sample timing determined based at least in part on the synchronization signal.

Example 32. The apparatus of example 31, wherein the at least one memory and the computer program code are configured, with the at least one processor, to cause the apparatus to perform operations of the methods in any of examples 2 to 9.

Example 33. An apparatus, comprising:
at least one processor; and
at least one memory including computer program code,
the at least one memory and the computer program code configured, with the at least one processor, to cause the apparatus to perform operations comprising:
transmitting from a base station toward a user equipment a synchronization signal; and
synchronizing clocks between the base station and the user equipment using a combination of sample and sub-sample timing determined based on at least the synchronization signal.

Example 34. The apparatus of example 33, wherein the at least one memory and the computer program code are configured, with the at least one processor, to cause the apparatus to perform operations of the methods in any of examples 11 to 14.

Example 35. A user equipment comprising any of the apparatus of claims 17 to 25.

Example 36. A base station comprising any of the apparatus of claims 27 to 31.

Example 37. A communication system comprising an apparatus according to any of claims 17 to 25 and an apparatus according to any of claims 27 to 31.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1B. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
receiving at a user equipment a synchronization signal from a base station; and
synchronizing clocks between the user equipment and the base station using a combination of sample and sub-sample timing determined based at least in part on the synchronization signal, wherein the synchronizing comprises:
identifying at the user equipment a first sub-sample shift of the synchronization signal, the first sub-sample shift being from an offset of the synchronization signal to zero offset of the synchronization signal, the first sub-sample shift caused by addition of a propagation delay in sub-samples between the user equipment and the base station to a clock offset in sub-samples between a clock at the user equipment and a clock at the base station;
sending by the user equipment another synchronization signal towards the base station;
receiving, from the base station and responsive to the other synchronization signal, an indication of a second sub-sample shift, the second sub-sample shift caused by a difference between the propagation delay in sub-samples and the clock offset in sub-samples;
calculating by the user equipment a sub-sample clock delay based on the addition and the difference;
synchronizing the clock at the user equipment with the clock at the base station by applying by the user equipment the sub-sample clock delay to the clock at the user equipment.

2. The method of claim 1, wherein:
a first equation for the first sub-sample shift is $xa=xp+xo$, where $xa$ is the first sub-sample shift, $xp$ is the propagation delay in sub-samples between the user equipment and the base station, and $xo$ is the clock offset in sub-samples between the clock at the user equipment and the clock at the base station;
a second equation for the second sub-sample shift is $xd=xp-xo$, where $xd$ is the second sub-sample shift; and
the calculating by the user equipment the sub-sample clock delay based on the addition and the difference comprises performing the calculating using the first and second equations.

3. The method of claim 1, wherein identifying at the user equipment the first sub-sample shift of the synchronization signal comprises:
sampling the synchronization signal;
performing a fast Fourier transform on the sampled synchronization signal to create a first result;
multiplying the first result with an exponential function that corresponds to a time shift of one sub-sample to create a second result;
performing an inverse fast Fourier transform on the second result to create a time-domain result;
performing the fast Fourier transform, the multiplying, and performing the inverse fast Fourier transform while keeping track of a number of sub-samples the synchronization signal has been time shifted, until the time domain result matches a synchronization signal with no offset; and
setting the first sub-sample shift as the number of sub-samples the synchronization signal has been time shifted.

4. The method of claim 1, wherein:
the user equipment and the base station are part of a first network; and
the method further comprises communicating by the user equipment with a station in a second, different network at least by using the synchronized clock at the user equipment.

5. The method of claim 4, wherein the first network uses third generation partnership protocols, and the second network uses protocols for time sensitive networking.

6. The method of claim 4, wherein:
communicating by the user equipment comprises communicating with the station in the second, different network at least by using the synchronized clock that has been synchronized at both sub-sample level and sample level.

7. The method of claim 4, wherein:
communicating by the user equipment comprises communicating with the station to synchronize a clock used by the station with clock at the user equipment, using a precision time protocol process.

8. The method of claim 1, wherein:
the synchronizing clocks using the combination of sample and sub-sample timing comprises synchronizing at a sample level the clock at the user equipment using a precision time protocol process performed between the user equipment and the base station.

9. An apparatus, comprising:
one or more processors; and
one or more memories including computer program code, the one or more memories and the computer program code configured, with the one or more processors, to cause the apparatus to at least:
receive a synchronization signal from a base station; and
synchronize clocks between the apparatus and the base station using a combination of sample and sub-sample timing determined based at least in part on the synchronization signal, wherein the synchronizing comprises:
identifying a first sub-sample shift of the synchronization signal, the first sub-sample shift being from an offset of the synchronization signal to zero offset of the synchronization signal, the first sub-sample shift caused by addition of a propagation delay in sub-samples between the apparatus and the base station to a clock offset in sub-samples between a clock at the apparatus and a clock at the base station;
sending another synchronization signal toward the base station;
receiving, from the base station and responsive to the other synchronization signal, an indication of a second sub-sample shift, the second sub-sample shift caused by a difference between the propagation delay in sub-samples and the clock offset in sub-samples;
calculating a sub-sample clock delay based on the addition and the difference;
synchronizing the clock at the apparatus with the clock at the base station by applying the sub-sample clock delay to the clock at the apparatus.

10. The apparatus of claim 9, wherein:
a first equation for the first sub-sample shift is $xa=xp+xo$, where xa is the first sub-sample shift, xp is the propagation delay in sub-samples between the apparatus and the base station, and xo is the clock offset in sub-samples between the clock at the apparatus and the clock at the base station;
a second equation for the second sub-sample shift is $xd=xp-xo$, where xd is the second sub-sample shift; and
the calculating the sub-sample clock delay based on the addition and the difference comprises performing the calculating using the first and second equations.

11. The apparatus of claim 9, wherein the identifying the first sub-sample shift of the synchronization signal comprises:
sampling the synchronization signal;
performing a fast Fourier transform on the sampled synchronization signal to create a first result;
multiplying the first result with an exponential function that corresponds to a time shift of one sub-sample to create a second result;
performing an inverse fast Fourier transform on the second result to create a time-domain result;
wherein the performing the fast Fourier transform, the multiplying, and the performing the inverse fast Fourier transform are performed while keeping track of a number of sub-samples the synchronization signal has been time shifted, and are performed until the time domain result matches a synchronization signal with no offset; and
setting the first sub-sample shift as the number of sub-samples the synchronization signal has been time shifted.

12. The apparatus of claim 9, wherein:
the apparatus and the base station are part of a first network; and
the apparatus is further caused to communicate with a station in a second, different network at least by using the synchronized clock at the apparatus.

13. The apparatus of claim 12, wherein the first network uses third generation partnership protocols, and the second network uses protocols for time sensitive networking.

14. The apparatus of claim 12, wherein:
the communicating comprises communicating with the station in the second, different network at least by using the synchronized clock that has been synchronized at both sub-sample level and sample level.

15. The apparatus of claim 12, wherein:
the communicating comprises communicating with the station to synchronize a clock used by the station with clock at the apparatus, using a precision time protocol process.

16. The apparatus of claim 9, wherein:
the synchronizing clocks using the combination of sample and sub-sample timing comprises synchronizing at a sample level the clock at the apparatus using a precision time protocol process performed between the apparatus and the base station.

17. An apparatus, comprising:
one or more processors; and
one or more memories including computer program code, the one or more memories and the computer program code configured, with the one or more processors, to cause the apparatus to at least:
transmit towards a user equipment a synchronization signal; and
synchronize clocks between the apparatus and the user equipment using a combination of sample and sub-sample timing determined based on at least the synchronization signal,
wherein the synchronization signal enables the user equipment to calculate a first sub-sample shift, and wherein the synchronizing clocks using the combination of sample and sub-sample timing comprises:
receiving from the user equipment another synchronization signal;
identifying a second sub-sample shift of the other synchronization signal, the second sub-sample shift being from an offset of the other synchronization signal to zero offset for the other synchronization signal, the second sub-sample shift caused by a difference between a propagation delay in sub-samples between the user equipment and the apparatus and a clock offset in sub-samples between a clock at the user equipment and a clock at the apparatus; and
transmitting, towards the user equipment, an indication of a second sub-sample shift, the second sub-sample shift enables the user equipment to synchronize the clock at a sub-sample level at the user equipment with the clock at the apparatus.

* * * * *